US010609791B2

(12) United States Patent
Soomro et al.

(10) Patent No.: US 10,609,791 B2
(45) Date of Patent: Mar. 31, 2020

(54) LIGHTING SYSTEM OPTIMIZED FOR COST REDUCTION

(71) Applicant: SIGNIFY HOLDING B.V., Eindhoven (NL)

(72) Inventors: Amjad Soomro, Hopewell Junction, NY (US); Dave Alberto Tavares Cavalcanti, Mahopac, NY (US); Dan Jiang, Westford, MA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/770,078

(22) PCT Filed: Oct. 20, 2016

(86) PCT No.: PCT/EP2016/075242
§ 371 (c)(1),
(2) Date: Apr. 20, 2018

(87) PCT Pub. No.: WO2017/068049
PCT Pub. Date: Apr. 27, 2017

(65) Prior Publication Data
US 2018/0317304 A1    Nov. 1, 2018

Related U.S. Application Data

(60) Provisional application No. 62/245,059, filed on Oct. 22, 2015.

(51) Int. Cl.
*H05B 33/08* (2020.01)
*H05B 37/02* (2006.01)
(Continued)

(52) U.S. Cl.
CPC .......... *H05B 37/0272* (2013.01); *F21S 8/086* (2013.01); *H05B 33/0854* (2013.01); *H05B 37/0227* (2013.01); *H05B 37/034* (2013.01)

(58) Field of Classification Search
CPC ....... H04W 84/18; H04W 16/14; H04W 4/70; H04W 36/14; H04W 40/04; H04W 40/22;
(Continued)

(56) References Cited

U.S. PATENT DOCUMENTS 7,035,932 B1 *  4/2006  Dowling ................ G06Q 20/04
                                                    709/230
8,248,948 B2 *  8/2012  Weil ........................ H04L 43/50
                                                    370/237
(Continued)

FOREIGN PATENT DOCUMENTS

WO    2012146256 A3   11/2012
WO    2013188536 A1   12/2013
(Continued)

OTHER PUBLICATIONS

Daniel L. Gerlough, "Use of Poisson Distribution in Highway Traffic", The ENO Foundation for Highway Traffic Control, Saugatuck, CT, 1955, Columbia Press, pp. 1-78.
(Continued)

*Primary Examiner* — Tung X Le
*Assistant Examiner* — Borna Alaeddini
(74) *Attorney, Agent, or Firm* — Daniel J. Piotrowski (57) ABSTRACT

A method and corresponding system is disclosed for use in a Networked Lighting Control System whereby communication costs (e.g. costs associated with LTE technologies), variable electric rates and traffic models are analyzed to maximize cost savings. In one example, the system consists of receiving cellular usage rates, electric usage rates, and generated traffic models or statistics to manage transmission and broadcast of usage rates to lighting poles. An apparatus associated with the lighting pole can then use this information to determine frequency of sending lighting commands to nearby poles.

8 Claims, 5 Drawing Sheets

(51) Int. Cl.
*H05B 37/03* (2006.01)
*F21S 8/08* (2006.01)

(58) Field of Classification Search
CPC ........... H04W 74/0808; H04W 84/042; H04W 88/06; H04W 8/005; H04W 16/10; H04W 24/00; H04W 24/02; H04W 24/08; H04W 28/0226; H04W 28/0273; H04W 36/0011; H04W 36/0055; H04W 36/22; H04W 36/38; H04W 40/02; H04W 40/10; H04W 40/28; H04W 40/32; H04W 48/16; H04W 48/18; H04W 4/90; H04W 52/0216; H04W 52/0219; H04W 52/0254; H04W 52/0258; H04W 52/04; H04W 52/46; H04W 60/00; H04W 60/04; H04W 72/00; H04W 72/04; H04W 72/0413; H04W 72/042; H04W 72/0446; H04W 72/085; H04W 72/12; H04W 76/15; H04W 76/28; H04W 80/04; H04W 84/047; H04W 84/10; H04W 88/16; H04W 8/24; H04W 8/245; H04W 92/02; H05B 37/0272; H05B 37/0245; H05B 37/034; H05B 33/0854; H05B 37/0227; H05B 37/02; H05B 37/0281; H05B 33/08; H05B 33/0845; H05B 33/0857; H05B 33/0884; H05B 37/00; H05B 37/0218; H05B 37/0254

See application file for complete search history.

(56) References Cited

U.S. PATENT DOCUMENTS

| 8,456,325 | B1* | 6/2013 | Sikora | G08G 1/087 340/909 |
|---|---|---|---|---|
| 8,570,190 | B2 | 10/2013 | Marinakis et al. | |
| 8,732,031 | B2* | 5/2014 | Martin | G06Q 40/00 705/26.1 |
| 8,878,451 | B2* | 11/2014 | Lee | H04L 41/0806 315/291 |
| 9,089,011 | B2* | 7/2015 | Steininger | H05B 37/0245 |
| 9,591,726 | B2* | 3/2017 | Harbers | H05B 33/0842 |
| 10,398,010 | B2* | 8/2019 | Oliver | H05B 37/0218 |
| 2004/0225649 | A1* | 11/2004 | Yeo | G01D 4/004 |
| 2009/0066540 | A1* | 3/2009 | Marinakis | H05B 37/0272 340/909 |
| 2011/0274094 | A1* | 11/2011 | Jovicic | G01S 5/0252 370/338 |
| 2013/0223686 | A1* | 8/2013 | Shimizu | G08G 1/166 382/103 |
| 2014/0028216 | A1* | 1/2014 | Wang | H05B 37/0245 315/294 |
| 2015/0106508 | A1* | 4/2015 | Knibbe | H05B 37/0218 709/224 |
| 2016/0021637 | A1* | 1/2016 | Cao | H04W 64/006 455/440 |
| 2016/0203190 | A1* | 7/2016 | Zinger | G01K 1/02 707/749 |
| 2017/0060250 | A1* | 3/2017 | Nayak | G06F 3/017 |
| 2017/0181053 | A1* | 6/2017 | Aoun | H04W 28/0226 |

FOREIGN PATENT DOCUMENTS

| WO | 2014147494 A1 | 9/2014 |
|---|---|---|
| WO | 2014147524 A1 | 9/2014 |

OTHER PUBLICATIONS http://en.wikipedia.org/wiki/Rayleigh distribution.
Yuan He et al, "Collaborative Query Processing Among Heterogeneous Sensor Networks", Heterogeneous Sensor and Actor Networks, ACM, May 2008, pp. 25-30.

* cited by examiner

LIGHTING SYSTEM OPTIMIZED FOR COST REDUCTION

CROSS-REFERENCE TO PRIOR APPLICATIONS

This application is the U.S. National Phase application under 35 U.S.C. § 371 of International Application No. PCT/EP2016/075242, filed Oct. 20, 2015which claims the benefit of U.S. Provisional Patent Application No. 62/245,059, filed on Oct. 22, 2015. These applications are hereby incorporated by reference herein.

This application relates to the field of light management systems and more particularly to a method and a system to optimize cost savings by analyzing communication technologies employed and their associated usage costs, variable electric rates, and traffic modelling. In one embodiment, the system comprises receiving cellular usage rates, electric usage rates, and generated traffic models or statistics to manage transmission and to broadcast this information to lighting poles. In a further embodiment, a lighting pole apparatus is disclosed which uses this information to determine frequency of sending lighting commands to nearby poles to turn on their respective lights.

As described in co-pending Application No. WO2014/147524A1 entitled "Methods and Apparatus for Information Management and Control of Outdoor Lighting Networks," recent advances in LED and other lighting technologies have enabled a variety of lighting effects in many applications. One such application is light-on-demand by which street lights are illuminated (or brightened) only when warranted, thereby saving on energy costs. In typical light-on-demand applications, as activity is detected by a street light apparatus, nearby poles are sent message(s) to turn on their respective light(s) with the expectation that the subject will need to have additional light in the vicinity due to the subject's movement or, more generally, a need for increased visibility nearby.

Figure 1:
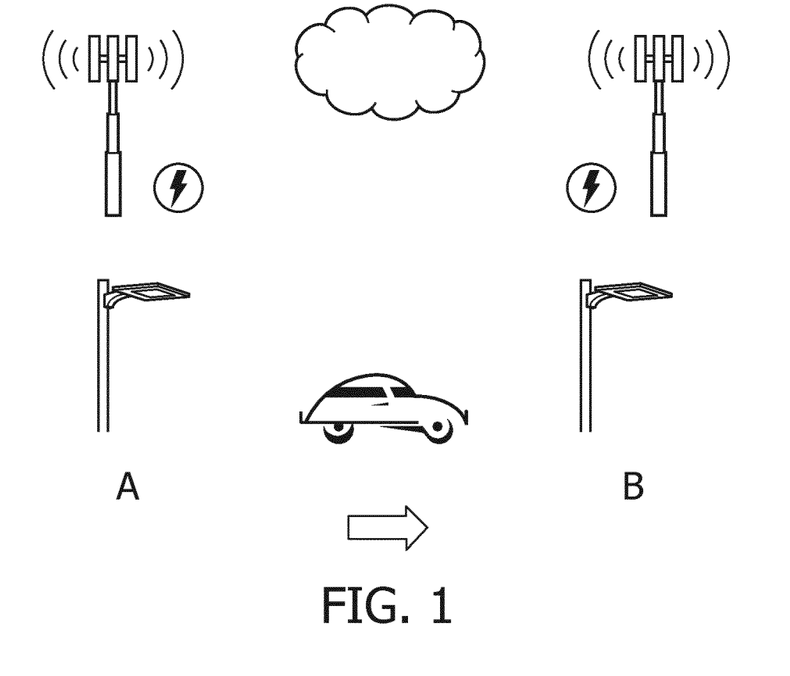
FIG. 1 illustrates a schematic of a car moving from under pole A to pole B and lights on pole B being activated as a result of a received message from pole A.

By way of example, FIG. 1 illustrates a scenario in which a car moves from the vicinity of pole A towards pole B. Pole B, in response to an electronic message sent from pole A, turns on its light. In such systems, a command sent from one pole to another to turn on light is interpreted to turn on the light, at the receiving pole, for a fixed duration. For example, it could be interpreted to turn on light for 30 seconds.

Typically, in the past, the communication for carrying lighting command messages was done in unlicensed bands and WLAN and WPAN technologies, such as Wi-Fi and ZigBee. More recently, the wireless communications between lights are also performed using cellular wireless technologies such as LTE and their upcoming versions such as LTE-A.

This strategy to send such commands has several drawbacks. First, a command needs to be sent for each activity detected in the transmitting station. There are costs associated with transmitting such commands. Generally, it is costlier to send commands using LTE technologies compared to WLAN/WPAN technologies, therefore, it may potentially cost more if switchover to LTE technology occurs. The current invention contemplates that still further communication technologies (with their respective costs) are capable of being employed in such systems. While the description below discusses LTE technologies, the invention is not so limited as the principles of the invention are applicable to any communication technology where costs of transmission need to be considered in seeking to optimize the system.

The benefit of using Light-on-demand is that it saves energy costs when there is no activity. However, in the case of moderate to high activity frequent messages could be sent and there are costs associated with sending messages using LTE technologies. Therefore, if there are a high number of messages, the message transmission costs could potentially outweigh savings due to turning out lights.

Therefore, there is need in the art to optimize cost savings given some measure of message transmission cost, the savings achieved by turning off lights, and the network traffic characteristics such as high traffic, moderate traffic or low traffic. The traffic pattern could be more specifically characterized by the number of instances of activity in a given time, the inter-gap distribution etc.

This invention discloses a system, methods and devices which optimize the cost savings attained in a light-on-demand system. That is, given some measure of message transmission costs and network traffic characteristics, the invention seeks to maximize savings achieved by dimming lights by mathematically evaluating these parameters.

In the following detailed description, for purposes of explanation and not limitation, representative embodiments disclosing specific details are set forth in order to provide a thorough understanding of the claimed invention. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatus and methods may be omitted so as to not obscure the description of the representative embodiments. Such methods and apparatus are clearly within the scope of the claimed invention.

The above and other exemplary features, aspects, and advantages of the present invention will be more apparent from the following detailed description taken in conjunction with the accompanying drawings, in which.

It is to be understood that these drawings are solely for purposes of illustrating the concepts of the invention and are not intended as a definition of the limits of the invention. It will be appreciated that the same reference numerals, possibly supplemented with reference characters, where appropriate, have been used throughout to identify corresponding parts.

As noted above, the current invention relates to a light-on-demand system. In general, the invention relates to a system or device which receives as inputs: a set of activity triggers and cost of transmitting a message. In various embodiments, a turn-on time is then calculated taking into account these inputs. When warranted as discussed below, the system or device then outputs one or more messages with turn-on information associated with a given trigger. This turn-on information may include a light duration parameter, a light intensity parameter, a delay associated with the speed of the object for which illumination is being triggered, and other parameters typically associated with light-on-demand applications.

Figure 2:
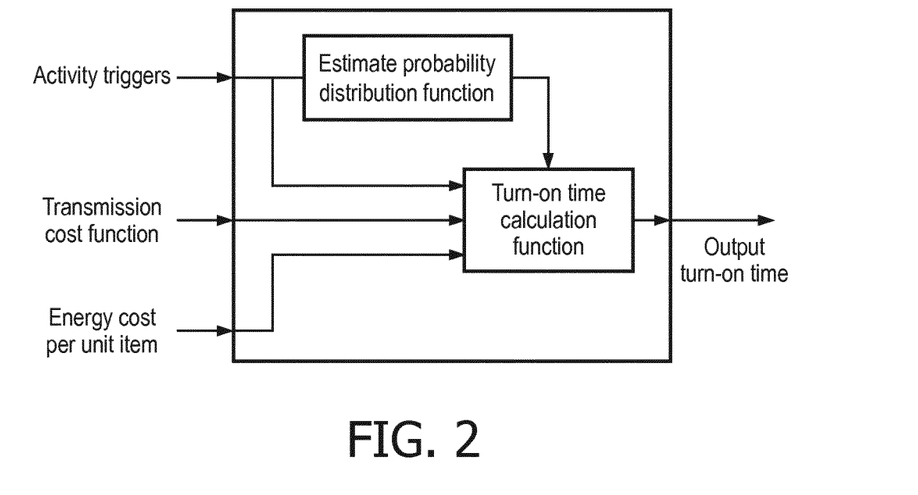
FIG. 2 illustrates an overview of an exemplary method employed by the current invention in deriving a turn-on time.

FIG. 2 illustrates an exemplary method employed by the current invention. As illustrated the method takes as input:
1. The activity triggers as they happen;
2. The cost of transmitting a message via LTE network (Transmission Cost Function)
3. The energy per unit time cost of energy usage when lamp is ON (Energy Usage Cost Function)

In this embodiment the method includes estimating a probability distribution function based on the received triggers. As shall be described in detail below, the method further includes deriving a turn-on time calculation function. This function is then used to calculate the turn-on-time that seeks to maximize costs savings in view of the inputted parameters. The calculated turn-on time is then, for example, transmitted wirelessly using LTE technology to the neighboring light pole(s) along with the command to turn-on the light. The neighboring light pole receives the turn-on command and the turn-on time and then turns on the light according to the value contained in the message.

As described above, the method depicted in FIG. 2 can be performed at one or more of the light poles involved. In alternative embodiments, rather than performing the depicted step of estimating the probability distribution function(s) associated with the activity triggers, the model type(s) of probability distribution function associated with the trigger(s) can be provided as an additional input. In further embodiments, a centralized server can be utilized to perform one or more of the functions depicted in FIG. 2.

Figure 3:
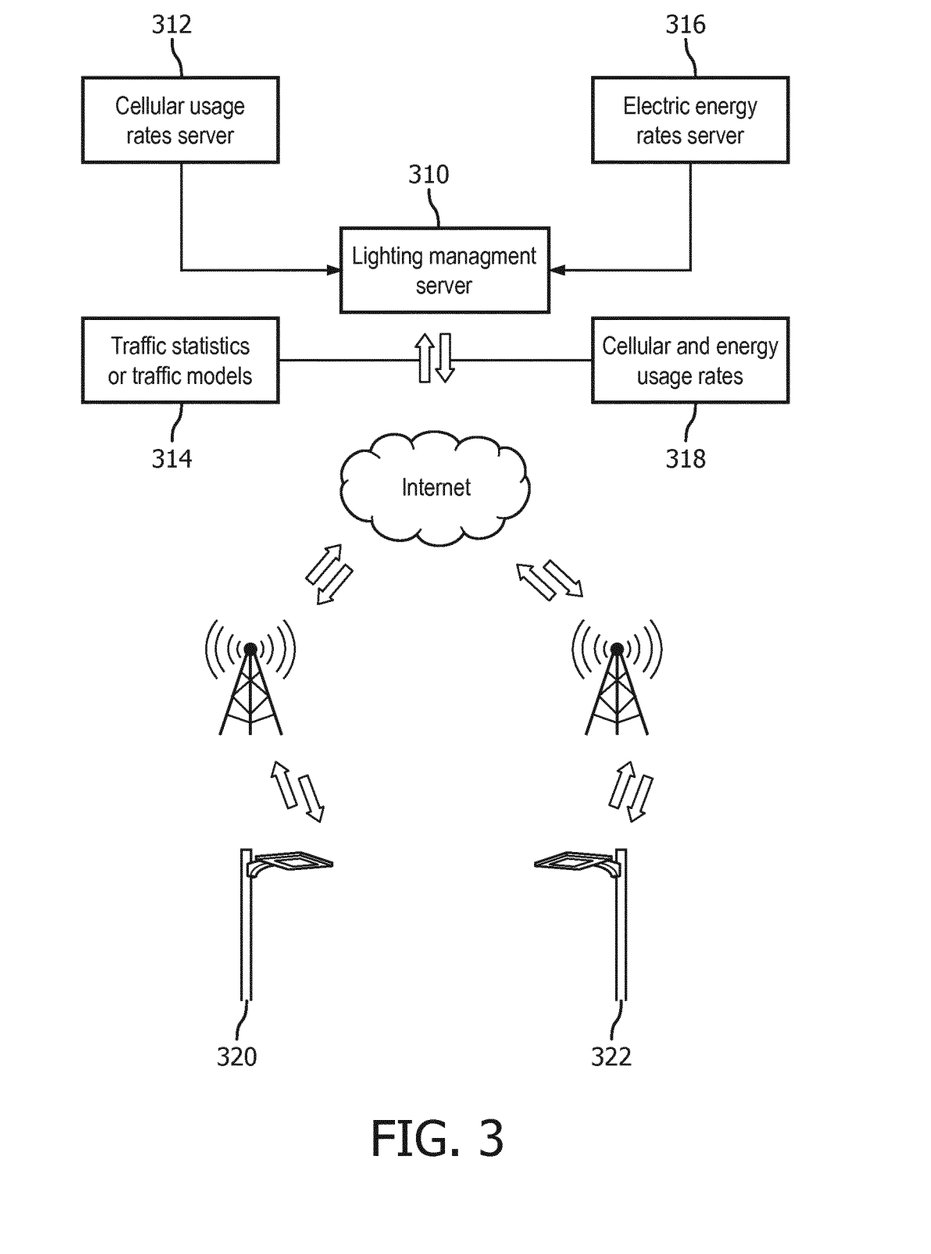
FIG. 3 illustrates an example of a lighting management system according to an embodiment of the invention.

FIG. 3 is an example of a lighting management system according to an embodiment in the invention. As illustrated, a light management server 310 receives cellular usage rates from one or more cellular usage rates servers 312, electric energy rates from one or more electric energy rates servers 316, and traffic statistics 314 provided over an Internet connection or via direction communication with one or more light poles 320, 322. This traffic information may comprise one or more traffic models or one or more traffic statistics (e.g., mean standard deviation, histograms, etc.).

Using these inputs, the system performs management and distribution functions for cellular usage and electric energy rates. In particular, upon reception of these inputs the system decides, based on the inputs received, whether or not transmission of cellular usage rates and electric energy rates 318 to one or more, electric utility poles is warranted. That is, some variations in any of the input rates, for example, electric rates, may not result in transmission of the updated rates to any of the electric poles. An exemplary method as to how this decision is determined is illustrated in FIG. 4.

Figure 4:
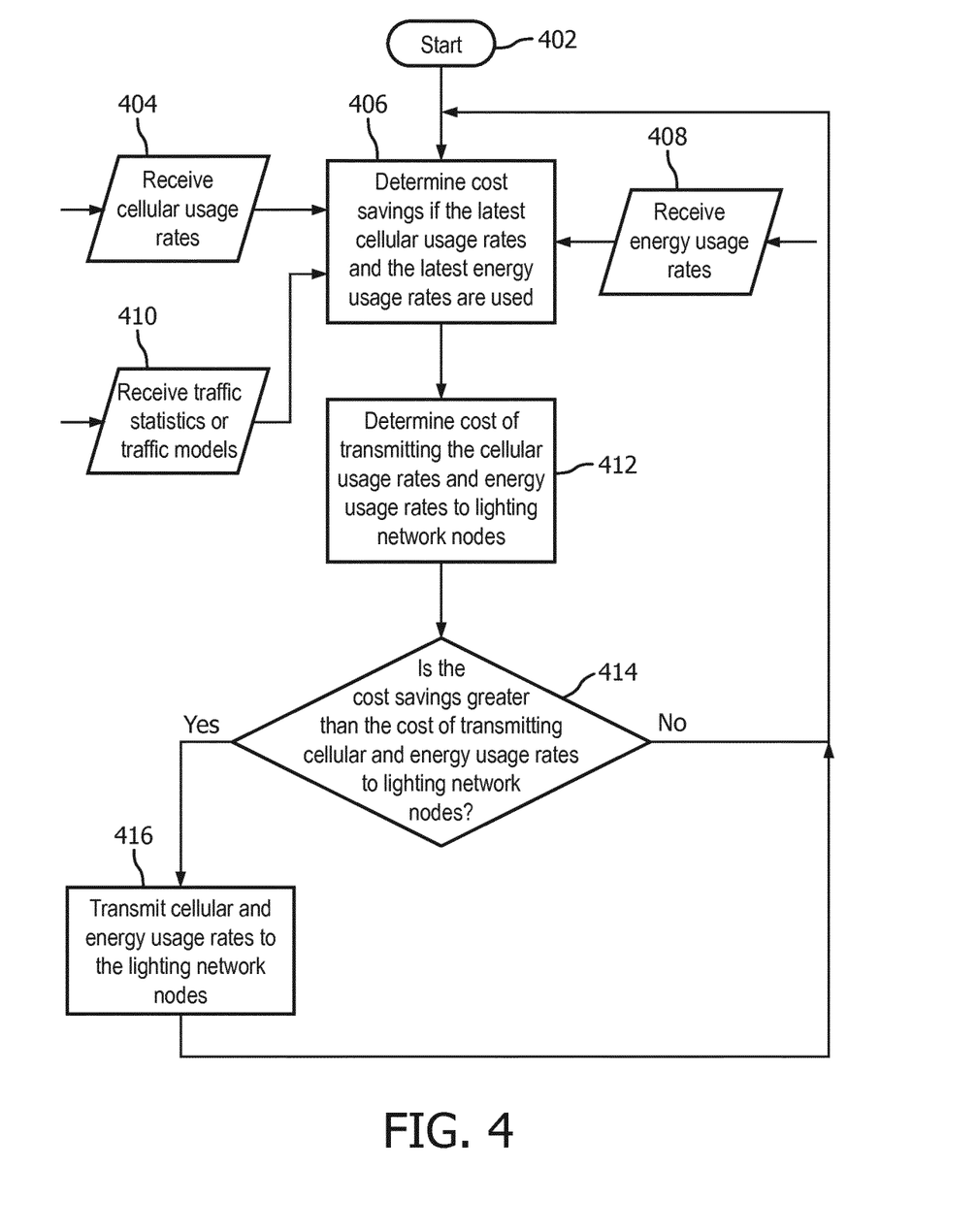
FIG. 4 illustrates a flow chart depicting the lighting management server decision whether transmission of the latest cellular usage and energy rates is warranted.

As depicted in FIG. 4, a determination is made at step 406 of the cost savings that result based upon the latest cellular usage rates (received at step 404), latest energy usage rates (received at step 408) and latest traffic statistics/traffic models (received at step 410). In particular, this step determines the cost savings that would result if these parameters were distributed and used by light poles in the system. At step 412 the cost is determined of transmitting the new cellular usage rates and energy usage rates to the nodes of the lighting network. At step 414 a comparison is made of the costs determined in steps 406 and 412. At step 416, if the cost of savings (from step 406) is greater than the cost of transmitting rates (from step 412), the cellular and energy usage rates are transmitted to the lighting network nodes. If not, no transmission occurs. In either event, control returns to step 406 to await any changes in parameters which would then restart the process.

In additional embodiments, step 406 would comprise a timing function that would periodically trigger polling of respective servers (items 312 and 316 of FIG. 3) to obtain new usage rates. In still further embodiments, a sufficient change in the traffic statistics itself (e.g. an increase in 10%) would restart the process of steps 406, 412, 414 and 416 (and may optionally include polling to obtain the usage data at steps 404 and 408).

In further embodiments of the invention, in computing the cost savings, the system utilizes a computed turn-on time parameter that was discussed above with respect to FIG. 2 (and discussed below in greater detail with respect to FIGS. 5 and 6). Such calculations of the turn-on time parameter may be scheduled to be performed periodically, or may be performed when changes in traffic conditions warrant it.

In further embodiments, the turn-on time parameter may be a system configuration parameter that is based on, for example, government regulations or historic traffic patterns. In still further embodiments, such a configuration turn-on time parameter may be an initial or a default value that is overwritten by situations when a computed turn-on time value is warranted (e.g., unusual traffic patterns due to weather conditions).

As discussed above, the current invention seeks to improve cost savings in a light-on-demand system by reducing energy usage costs as well as reducing costs associated with communication between light poles themselves. As such, consideration is given to minimizing the turn-on time to thereby reduce energy costs. However, consideration is also given to providing a sufficiently long turn-on time to minimize the number of turn-on commands that need to be transmitted—to thereby reduce costs of transmitting those commands. The current invention balances these two conflicting considerations to improve cost savings at each light pole, and consequently for the entire system's collection of light poles.

Figure 5:
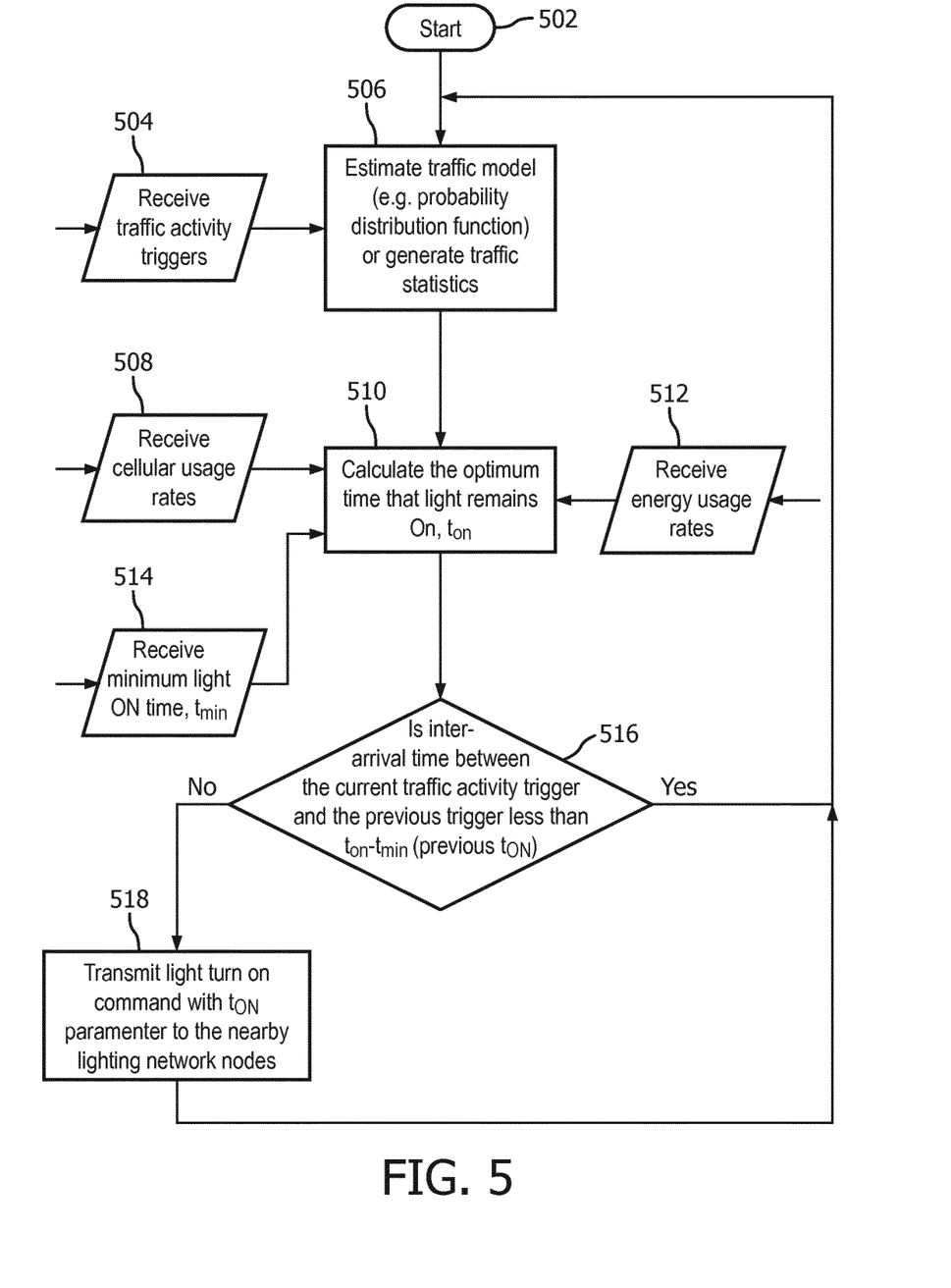
FIG. 5 illustrates a flow chart depicting an embodiment of the invention in which a lighting pole determines if transmission of a command to turn on lighting to nearby lighting poles needs to be done.

This aspect of the invention is exemplified in FIG. 5. In particular, FIG. 5 illustrates a flow chart depicting an embodiment of the invention in which a lighting pole determines if transmission of a command to turn on lighting to nearby lighting poles needs to be performed. This flow chart contains three main components:
1. Estimation of Probability Distribution function or cumulative probability distribution function (at Step 506)
2. The estimation of the optimized time that lamp is turned ON/remains ON (at Step 510)
3. The transmission of the protocol message which goes over the air (at Step 518).

In additional embodiments a receiver is disclosed which receives the transmitted message and turns ON the lamp according to the contents of the message.

These main components noted above will now be discussed in greater detail:

Estimation of Probability Distribution Function or Cumulative Probability Distribution Function As an initial matter, it should be noted that the terms probability distribution function and probability density function (pdf) are used interchangeably. The cumulative probability distribution function may also be used in place of probability density function since they are related mathematically. For discrete random values, probability mass function could be used. The relationship for a discrete random value case is similar to the one disclosed below. Accordingly, a person skilled in the art would be able to derive similar relationships from the disclosures made here for the continuous case.

Given a set of sampled activity instants, probability density functions could be estimated by known approaches in the prior art.

Estimation of the Optimized Time to Turn the Lamp ON
Let:
  Inter-arrival time between two consecutive cars be t
  Cost of transmitting a message be m
  Cost of energy per unit time be e
  Minimum time that light remains on after activity be $t_{min}$
  Time that light remains ON be $t_{ON}$
  Total number of cars in non-daylight hours be $N_{ND}$
  Cost of the light consumed per car C
  Upper limit on the cost of the lamp operation per car be $C_{max}$
  Upper limit on total cost of operation during non-daylight hours be $T_{max}$
  Inter-arrival probability density function be p(t)

Then, the maximum cost of light consumed per car, and the maximum cost of operation during non-daylight hours can be expressed respectively as:

$$C_{max} = m + e \cdot t_{ON}$$

$$T_{max} = N_{ND} \cdot (m + e \cdot t_{ON})$$

It should be noted that while this discussion relates to the detection of cars as being the activity triggers, the invention is not so limited as other types of detected movements are contemplated by the invention as being triggers (e.g., other types of vehicles, pedestrians on a sidewalk, etc.).

Figure 6:
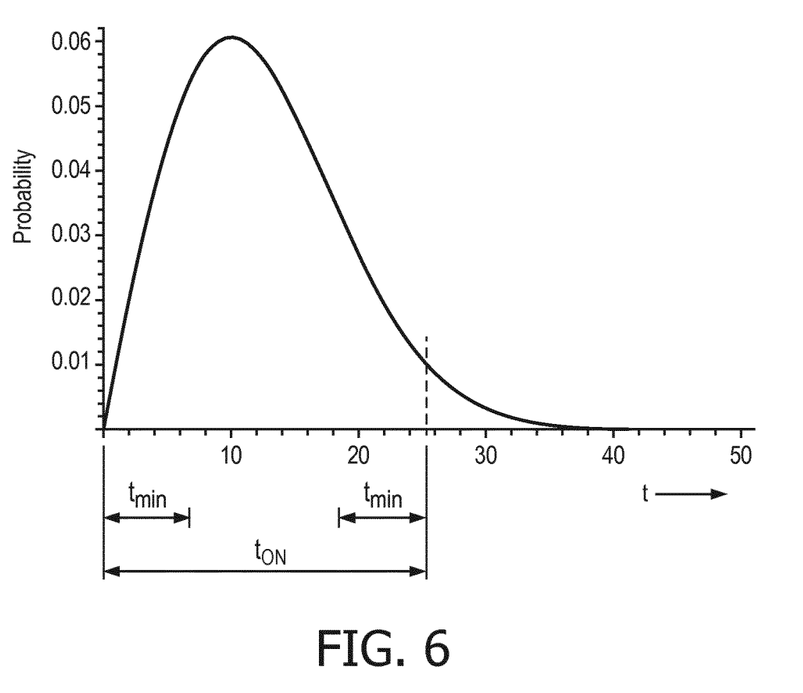
FIG. 6 depicts an exemplary inter-arrival probability density function, p(t), for the inter-arrival time between two consecutive cars.

FIG. 6 depicts an exemplary inter-arrival probability density function, p(t), in which the inter-arrival time between two consecutive cars is plotted as t values on the horizontal axis and the probability associated with those t values is plotted relative to the vertical axis.

With reference to FIG. 6, it is clearly shown that:

$$C = \begin{cases} m + e \cdot t_{ON} & t \geq t_{ON} \\ m + e \cdot t & t_{ON} > t \geq t_{ON} - t_{min} \\ 0 & t < t_{ON} - t_{min} \end{cases}$$

Then, the expected value of C is:

$$E[C] = P[t \geq t_{ON}] \cdot (m + e \cdot t_{ON}) + \int_{t_{ON}-t_{min}}^{t_{ON}} p(t) \cdot (m + e \cdot t) \, dt + + P[t < t_{ON} - t_{min}] \cdot 0$$

As can be seen by the above equation:

$$E[C] = f(t_{ON}, t_{min}, m, e)$$

Typically, $t_{min}$, m, e are fixed. Therefore, f could be plotted versus $t_{ON}$. Consequently an optimum $t_{ON}$ value can be found for a given probability density function, $t_{min}$, m and e. That is, a value for $t_{ON}$ that minimizes this E[C] function can be readily determined by well-known statistical methods (e.g., a value of $t_{ON}$ that yields a zero value for the first derivation of the E[C] function).

As described earlier, the invention updates values for m and e only when warranted (e.g., steps 414 and 416 of FIG. 4). Further, $t_{min}$, the minimum time that light remains on after activity is system design parameter that may entail the speed limit of the roadway or other governmental regulations. Consequently, $t_{min}$, m, e are parametric values that are fixed over a period of time and accordingly an optimum $t_{ON}$ value can be determined that minimizes the cost function described above. This value is then transmitted with the light turn-on command (as shown at step 518 of FIG. 5) to appropriate nearby lighting network nodes of a light-on-demand system—thereby seeking to minimized the operating costs of such a system.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

In that regard, it is to be understood the term "optimize" as used herein is the act of seeking a goal of an optimal value (e.g., a minimized cost of the light-on-demand system). That is, the term is not meant to mean that a true optimal value exists and the invention discovers it. Rather, the invention derives a value that is better than other values for the evaluated parameters. The term "minimize" is used herein in a similar manner.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method for use in a light-on-demand system, the system comprising a plurality of lights and utilizing one or more communication protocols, wherein each communication protocol having transmission and network traffic parameters, said method comprising:

receiving, in a server, the transmission and network traffic parameters for communication between the plurality of lights, said transmission and network traffic parameters including movement activity triggers relating to the plurality of lights, and/or communication costs for the one or more communication protocols;

receiving energy usage parameters for the plurality of lights;

deriving a probability density function associated with the movement activity triggers;

estimating an on-time parameter for a light of the plurality of lights based on the probability density function and the energy usage parameters and transmission and network traffic parameters;

determining, after a movement activity trigger in light, whether to transmit a light turn-on command to other lights of the plurality of lights based on an arrival time between the movement activity trigger in the light and a previous movement activity trigger in the light using the on-time parameter.

2. The method of claim 1 further comprising the step of transmitting to at least one of the plurality of lights, an on-time parameter and a command to turn on.

3. The method of claim 1 wherein the probability density function is estimated based on received movement activity triggers.

4. The method of claim 1 wherein the turn-on time parameter is determined by finding an on-time time parameter that minimizes an expected value cost function (E[C]).

5. The method of claim 4 wherein the expected value cost function (E[C]) is expressed as the following function:

$$E[C] = P[t \geq t_{ON}] \cdot (m + e \cdot t_{ON}) + \int_{t_{ON}-t_{min}}^{t_{ON}} p(t) \cdot (m + e \cdot t) \, dt$$

where:
t is Inter-arrival time between two consecutive activity triggers
m is Cost of transmitting a message
e is Cost of energy per unit time
$t_{min}$ is Minimum time that light remains on after activity
$t_{on}$ is Turn-on time parameter
C is Cost of the light consumed per activity trigger
p(t) is Inter-arrival probability density function.

6. A light-on-demand system which utilizes one or more communication protocols for which a cost is associated with at least one protocol; the light-on-demand system comprising:

a plurality of lights; and,
a light management server configured to receive transmission and network traffic parameters for communication between the plurality of lights for communication for the one or more communication protocols, wherein each communication protocol having transmission and network traffic parameters for the one or more communication protocols, said parameters including movement activity triggers relating to the plurality of lights, and/or communication costs for the one or more communication protocols; receiving energy usage parameters for the plurality of lights; energy, derive a probability density function associated with the movement activity triggers; estimate an on-time parameter for a light of the plurality of lights based on the probability density function and the energy usage parameters and transmission and network traffic parameters; determine, after a movement activity trigger in the light in the plurality of lights, whether to transmit a light turn-on command to other lights of the plurality of lights based on an arrival time between the movement activity trigger in the light and a previous movement activity trigger in the light using the on-time parameter.

7. The light-on-demand system of claim 6 wherein the turn-on time parameter is determined by finding an on-time time parameter that minimizes an expected value cost function (E[C]).

8. The light-on-demand system of claim 7 wherein the expected value cost function (E[C]) is expressed as the following function:

$$E[C] = P[t \geq t_{ON}] \cdot (m + e \cdot t_{ON}) + \int_{t_{ON}-t_{min}}^{t_{ON}} p(t) \cdot (m + e \cdot t) \, dt$$

where:
- t is Inter-arrival time between two consecutive activity triggers
- m is Cost of transmitting a message
- e is Cost of energy per unit time
- $t_{min}$ is Minimum time that light remains on after movement activity trigger
- $t_{on}$ is Turn-on time parameter
- C is Cost of the light consumed per activity trigger
- p(t) is probability density function.

* * * * *